(12) United States Patent
Wigsten et al.

(10) Patent No.: US 10,738,860 B2
(45) Date of Patent: Aug. 11, 2020

(54) HYDRAULIC TENSIONER WITH CONTROLLABLE INLET PRESSURE

(71) Applicant: BorgWarner Inc., Auburn Hills, MI (US)

(72) Inventors: Mark M. Wigsten, Lansing, NY (US); Kevin B. Todd, Freeville, NY (US); Dale N. Smith, Freeville, NY (US); Sean R. Simmons, Cortland, NY (US); Seongdo Hong, Ithaca, NY (US)

(73) Assignee: BorgWarner Inc., Auburn Hills, MI (US)

( * ) Notice: Subject to any disclaimer, the term of this patent is extended or adjusted under 35 U.S.C. 154(b) by 453 days.

(21) Appl. No.: 15/714,088

(22) Filed: Sep. 25, 2017

(65) Prior Publication Data

US 2018/0094709 A1    Apr. 5, 2018

Related U.S. Application Data

(60) Provisional application No. 62/402,243, filed on Sep. 30, 2016.

(51) Int. Cl.
    *F16H 7/08*    (2006.01)

(52) U.S. Cl.
    CPC ....... *F16H 7/08* (2013.01); *F16H 2007/0806* (2013.01); *F16H 2007/0812* (2013.01); *F16H 2007/0814* (2013.01); *F16H 2007/0823* (2013.01); *F16H 2007/0853* (2013.01); *F16H 2007/0859* (2013.01)

(58) Field of Classification Search
    CPC ........ F16H 7/08; F16H 7/0848; F16H 7/0834; F16H 2007/082; F16H 2007/0812; F16H 2007/0814; F16H 2007/0817; F16H 2007/0825; F16H 2007/0853; F16H 2007/0859; F16H 2007/0823
    See application file for complete search history.

(56) References Cited

U.S. PATENT DOCUMENTS

| | | | | |
|---|---|---|---|---|
| 6,343,621 B1* | 2/2002 | Holmes | ................ | F16K 27/041 |
| | | | | 137/625.61 |
| 6,746,352 B1* | 6/2004 | Poiret | ...................... | F01L 1/02 |
| | | | | 474/101 |
| 7,331,565 B2* | 2/2008 | Mills | ................... | F16K 31/0631 |
| | | | | 137/625.65 |
| 9,689,474 B2* | 6/2017 | Onoda | ...................... | F16H 7/08 |
| 2002/0052260 A1* | 5/2002 | Kitamura | ............... | F02B 67/06 |
| | | | | 474/135 |
| 2003/0171179 A1* | 9/2003 | Okuda | .................... | F16H 7/129 |
| | | | | 474/110 |
| 2009/0170647 A1* | 7/2009 | Mishima | ............... | F16H 7/0848 |
| | | | | 474/110 |

(Continued)

*Primary Examiner* — Michael R Mansen
*Assistant Examiner* — Raveen J Dias
(74) *Attorney, Agent, or Firm* — Brown & Michaels, PC

(57) ABSTRACT

A pressure regulator is in fluid communication with a supply inlet of a hydraulic tensioner to actively control fluid to the inlet of the hydraulic tensioner. By actively controlling the pressure regulator based on engine conditions and thus the oil pressure being fed to the hydraulic tensioner, the oil pressure to the hydraulic tensioner may be reduced at low engine speeds, increasing the efficiency of the timing system, or allowing full oil pressure at high engine speeds and low engine temperature.

16 Claims, 11 Drawing Sheets

(56) References Cited

U.S. PATENT DOCUMENTS

| | | | |
|---|---|---|---|
| 2009/0197722 A1* | 8/2009 | Emizu | F16H 7/0836 474/110 |
| 2011/0237370 A1* | 9/2011 | Hartmann | F16H 7/0836 474/110 |
| 2011/0256970 A1* | 10/2011 | Nakano | F16H 7/0836 474/110 |
| 2012/0202629 A1* | 8/2012 | O'Shea | F16H 7/0836 474/110 |
| 2012/0252616 A1* | 10/2012 | Tawarada | F16H 7/0848 474/110 |
| 2014/0187367 A1* | 7/2014 | Todd | F16H 7/08 474/110 |
| 2014/0309882 A1* | 10/2014 | Antchak | F02B 67/06 701/36 |
| 2015/0024887 A1 | 1/2015 | Oh et al. | |
| 2015/0240918 A1* | 8/2015 | Emizu | F01L 1/024 474/110 |
| 2016/0241110 A1 | 8/2016 | Maguire | |
| 2017/0175858 A1* | 6/2017 | Ryeland | F16H 7/0848 |

\* cited by examiner

HYDRAULIC TENSIONER WITH CONTROLLABLE INLET PRESSURE

CROSS-REFERENCE TO RELATED APPLICATIONS

This application claims the benefit of U.S. Patent Application No. 62/402,243 filed on Sep. 30, 2016, the disclosure of which is herein incorporated by reference in its entirety.

BACKGROUND

The invention pertains to the field of hydraulic tensioners. More particularly, the invention pertains to a mechanism to control inlet pressure of a hydraulic tensioner.

DESCRIPTION OF RELATED ART

In many engines, oil pressure supplied by the engine's oil systems to the tensioner is higher than necessary for proper tensioner function. The higher than necessary oil pressure supplied to the tensioner results in an increase in timing system friction caused by the extra force generated by the supply pressure to the tensioner. To combat this problem, passive pressure regulators are used with the tensioners to regulate the pressure provided to the tensioner in order to improve the frictional losses. Passive pressure regulators always regulate the inlet pressure to the hydraulic tensioner regardless of engine conditions, including, but not limited to, temperature and speed. However, there are conditions in the operating range in which full oil pressure to the tensioner is required and in using the pressure regulator, are not obtainable.

SUMMARY

A pressure regulator is in fluid communication with a supply inlet of a hydraulic tensioner to actively control fluid to the inlet of the hydraulic tensioner. By actively controlling the pressure regulator based on engine conditions and thus the oil pressure being fed to the hydraulic tensioner, the oil pressure to the hydraulic tensioner may be reduced at low engine speeds, increasing the efficiency of the timing system, or allowing full oil pressure at high engine speeds and low engine temperature.

In one embodiment, the active pressure regulator for regulating engine oil supply to an inlet of a hydraulic tensioner comprises a sleeve having a first sleeve land and second sleeve land, a spool slidably received within the sleeve having a first end and a second end; and a spring between the bore of the housing and the first end of the spool for biasing the spool in a first direction. The sleeve has a first open end and a closed second end received within a bore of a housing of the hydraulic tensioner. The spool comprises: a first land and a second land connected through a spindle; an outlet port between the first land and the second land within the spindle; an inlet port between the first land and the second land; a transverse through passage in the spindle in fluid communication with the inlet port, the outlet port, and a reservoir for storing fluid to the inlet of the hydraulic tensioner; and a central passage in fluid communication with the through passage and a chamber formed between the second end of the spool and the sleeve. When the spool is in a first position, fluid is blocked from entering the chamber and the reservoir from the inlet port by the third land of the spool. When the spool is in a second position, fluid from the inlet port enters the chamber through the through passage and the central passage and enters the reservoir, supplying fluid to the inlet of the hydraulic pressure at a pressure equal to the engine oil pressure.

The position of the active pressure regulator may be further influenced by a solenoid, which, when energized, allows fluid from the inlet line to be vented and when de-energized, allows fluid from the inlet line to recirculate through the solenoid back to the spring biased end of the spool of the pressure regulator.

In an alternate embodiment, the inlet line to the spool may be split into a first line and second line, with the first line in fluid communication with the pressure regulator between spool lands and a second line in fluid communication with an actuator. The actuator may be controlled by an engine controller. The actuator controls the fluid both flowing to the spring biased end of the pressure regulator and venting from the spring biased end of the pressure regulator.

DETAILED DESCRIPTION

In an embodiment of the present invention, a pressure regulator is in fluid communication with a supply inlet and the supply fluid to the hydraulic tensioner is actively controlled. By actively controlling the pressure regulator based on engine conditions and thus the oil pressure being fed to the hydraulic tensioner, the oil pressure to the tensioner may be reduced at low engine speeds, increasing the efficiency of the timing system, or allowing full oil pressure at high engine speeds and low engine temperature.

Figure 9:
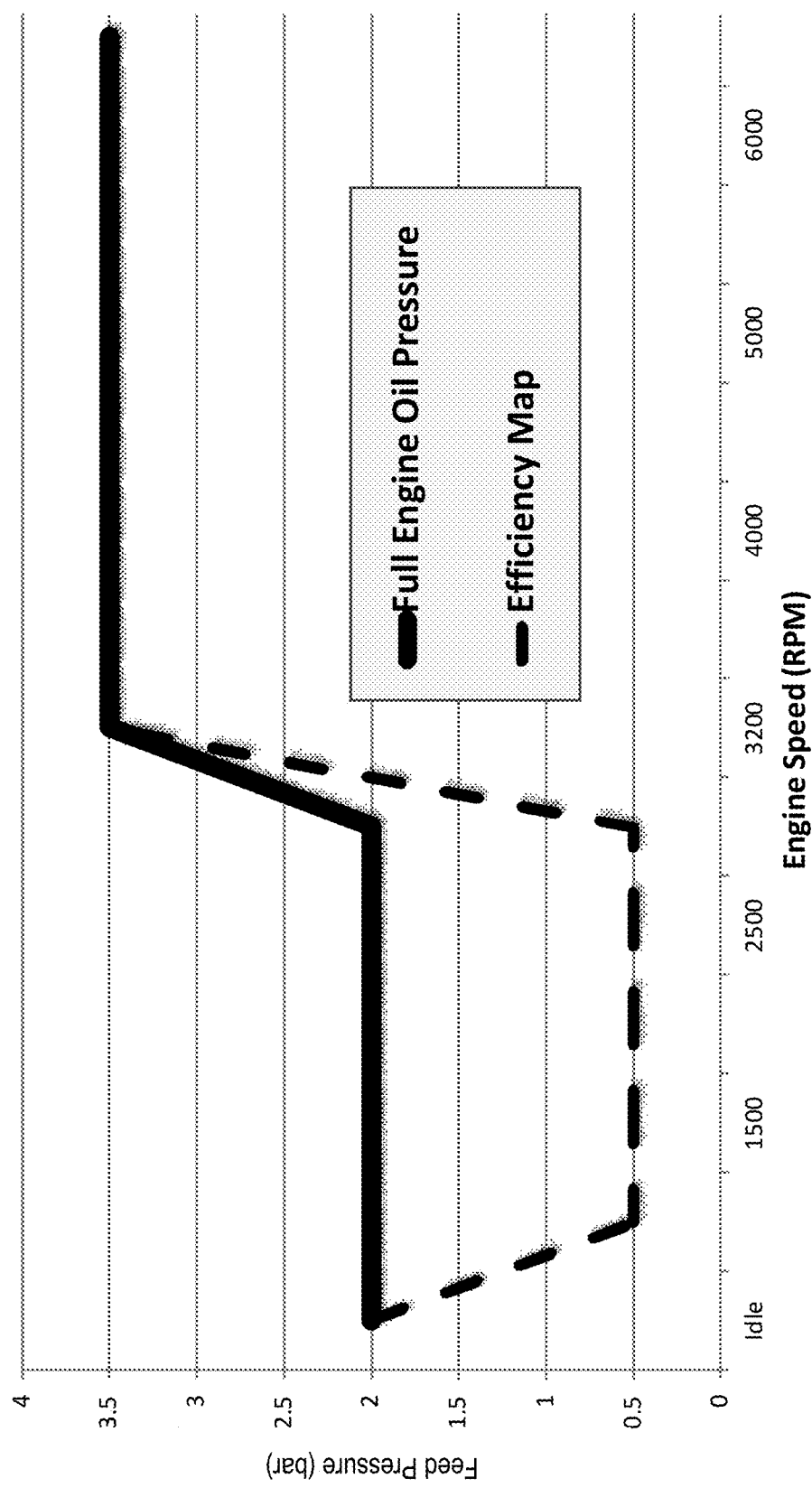
FIG. 9 shows a graph of tensioner feed pressure vs engine speed.

For example, as shown in FIG. 9, full engine pressure (solid line) is shown over a speed range of idle to 7000 rpm. As shown, the engine oil pressure is at 2 bar from idle to 2800 rpm. The pressure increases from 2 bar to approximately 3.5 bar at 2800 rpm and remains at 3.5 bar from 3400 rpm and up. The efficiency map (dashed line) represents the ideal efficiency of the engine as it relates to engine oil pressure being supplied to the tensioner. The engine is at its most efficient when the oil pressure supplied to the hydraulic tensioner is at 2 bar at idle, and decreases to 0.5 bar from 800 rpm to 2800 rpm and then increases at 2800 rpm to 3.5 bar, and from 2800 rpm and on, it is most efficient for the engine for the hydraulic tensioner to receive full engine oil pressure.

Therefore, in order to increase efficiency of the engine timing system, at low engine temperature and low speeds, the system is most efficient when low feed pressure is used and at high engine speeds, the efficiency is greatest at high feed pressures. Therefore, ideally at 2800 rpm, it is efficient for the engine to have the pressure regulation be deactivated to increase the pressure fed to the tensioner and use full engine oil pressure. During idle, it is more efficient for the engine to have the pressure regulation be active, lowering the engine oil pressure to 0.5 bar. The efficiency values and speed at which the engine is efficient may vary and is not limited to the values discussed above relative to FIG. 9.

FIGS. 1-8 show the hydraulic tensioner with a pressure regulator for regulating the pressure to a pressure chamber of a hydraulic tensioner which maintains tension in a chain.

Figure 6:
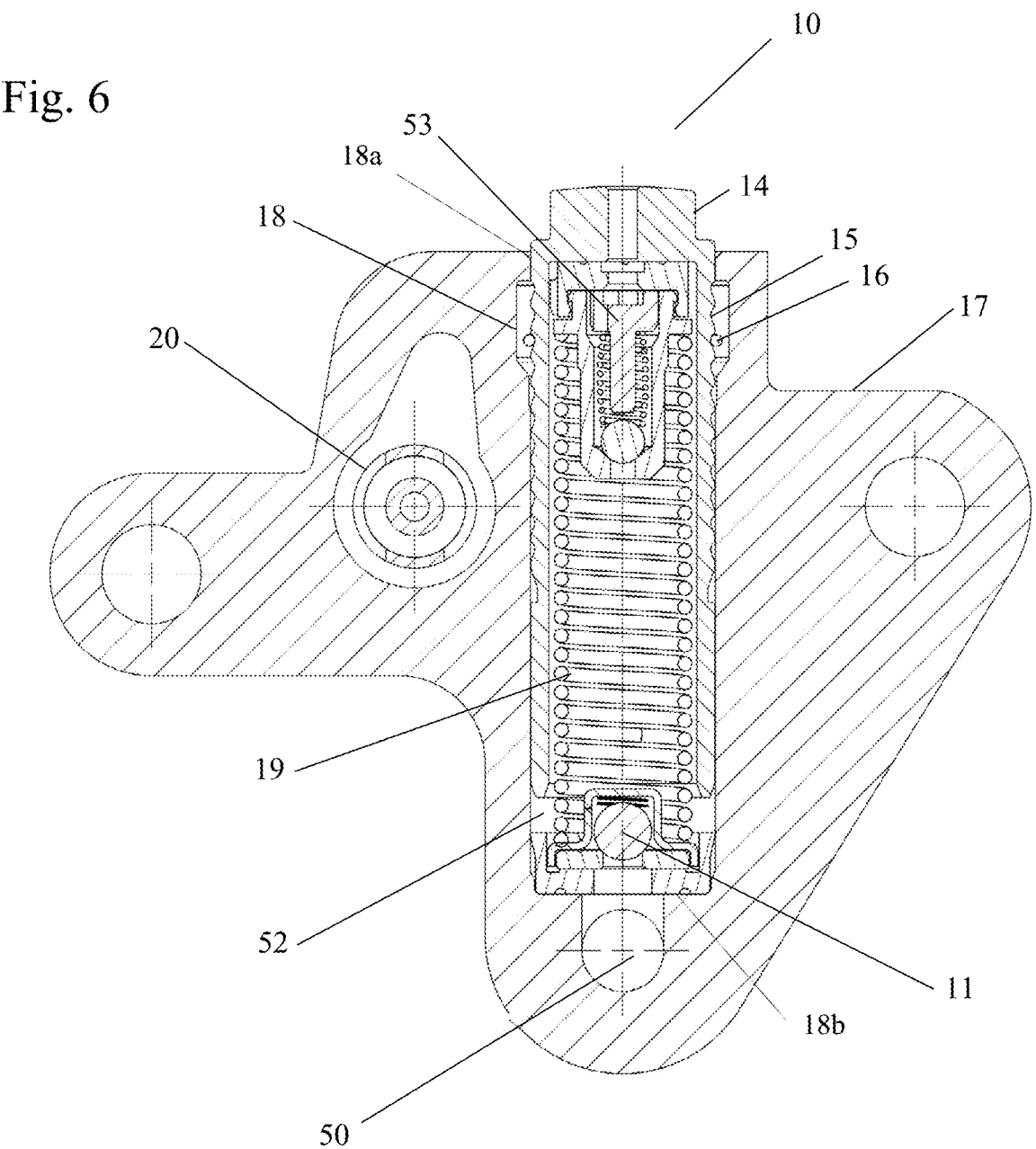
FIG. 6 shows a sectional view of the hydraulic tensioner along line 6-6 of FIG. 3.
Figure 7:
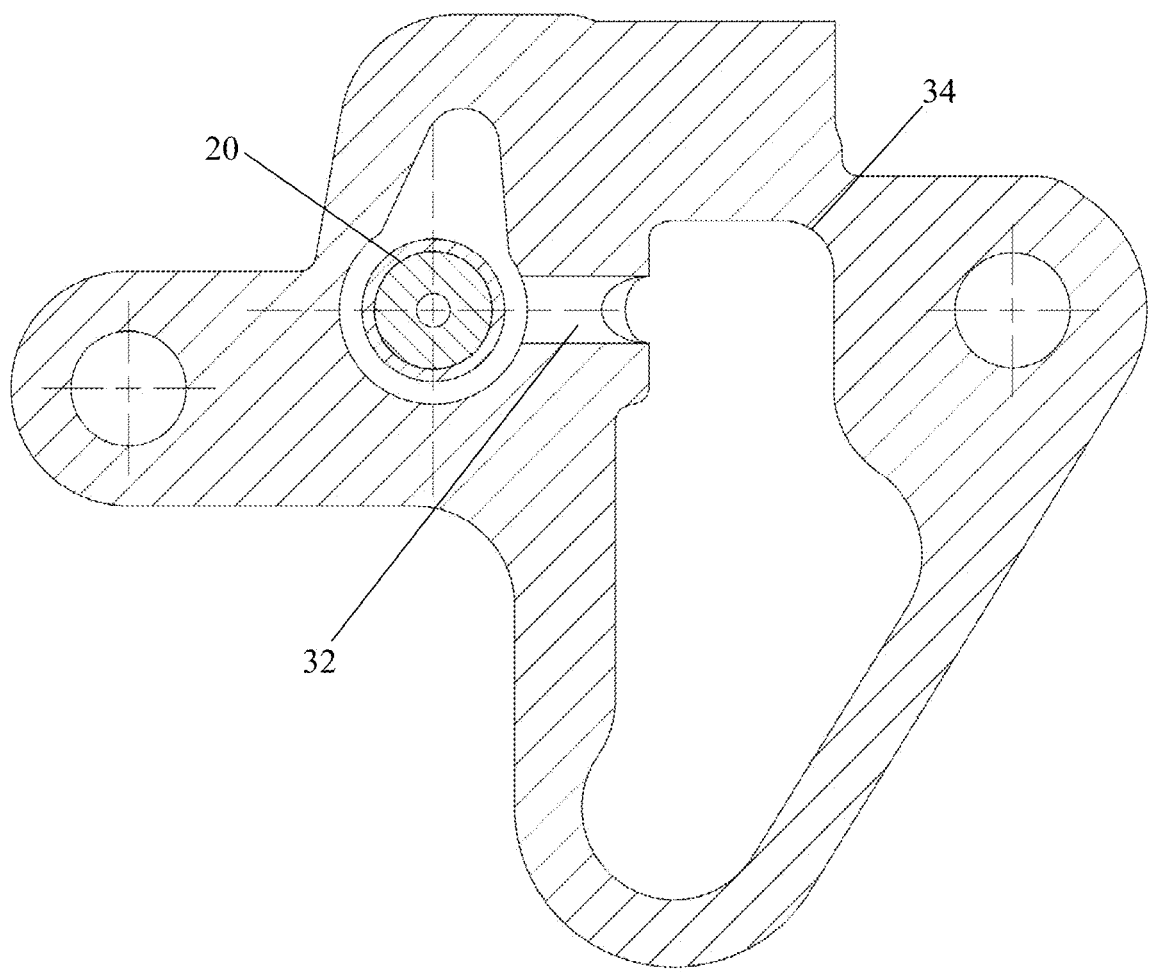
FIG. 7 shows a sectional view of the hydraulic tensioner along line 7-7 of FIG. 3.

Referring to FIGS. 6-7, a hydraulic tensioner 10 has a housing 17 with a bore 18 which receives a hollow piston 14. The bore 18 has an open end 18a and an inlet end 18b. The hollow piston 14 has a series of teeth 15 on an outer circumference which may receive a circlip 16. A pressure chamber 52 is formed between the bore 18 and the piston 14. Received within the hollow piston 14 is a biasing spring 19 which biases the piston 14 away from the inlet end 18b of the bore 18 of the housing 17. Also present within the hollow piston 14 is a check valve 11 at the inlet end 18b allowing fluid to enter the high pressure chamber 52 through the inlet 50, but not backflow to the inlet 50. A vent disk 53 may be present in the high pressure chamber 52. A pressure regulator 20 is preferably connected to the inlet 50 of the hydraulic tensioner 10.

The oil pressure supplied to the pressure chamber 52 via the inlet 50 may be full engine oil pressure or regulated engine pressure. As discussed above, there are certain circumstances over the speed range of the engine in which full engine pressure is desired and other times in which a lower, regulated pressure is desired.

Referring to FIGS. 4A-5B, the pressure regulator 20 has a slidable spool 21 with a series of passages and lands. The spool 21 is slidable within a closed end sleeve 28 and a stepped bore 33 of the housing 17 between a first position and a second position. The sleeve 28 is received within the bore 33 of the housing 17 of the tensioner 10. A first end 21d of the spool 21 is spring 30 biased in a first direction. The second end 21e of the spool 21 has a fluid reservoir 24 formed between the spool 21 and the closed end of the sleeve 28 and the fluid in the fluid reservoir 24 can bias the spool 21 in a second direction, opposite the first direction. The spool 21 has a first land 21a and a second land 21b separated by a spindle 21c, and is received within a sleeve 28. Between the first land 21a and second land 21b is a transverse through passage 22 connected to a central passage 23 in the spindle 21c. The through passage 22 is preferably in fluid communication with a fluid outlet 27. The through passage 22 is also in fluid communication with a reservoir 34 through a passage 32. The reservoir 34 is in fluid communication with the inlet 50 of the hydraulic tensioner 10. The central passage 23 is in fluid communication with reservoir 24 formed between the second land 21b of the spool 21 and the closed end 28c of the sleeve 28. The sleeve 28 has a first land 28a and a second land 28b.

A solenoid 12 has a series of coils 46 which may be energized or de-energized. An armature 42 has a first end 42a with a ball 43 containing electromagnetic material and a second end 42b received within the coils 46. The ball 43 of the armature 42 blocks or allows passage of fluid to pass through the solenoid 12 or vent to sump from the solenoid 12 through a central passage 44 or passage 45. Passages 44, 45 are in fluid communication with the first side 21d of the spool 21 of the pressure regulator 20 biased by spring 30. When the coils 46 are energized, the ball 43 of the armature 42 blocks the central passage 44. When the coils 46 are de-energized, the ball 43 of the armature 42 does not block the central passage 44.

Figure 1:
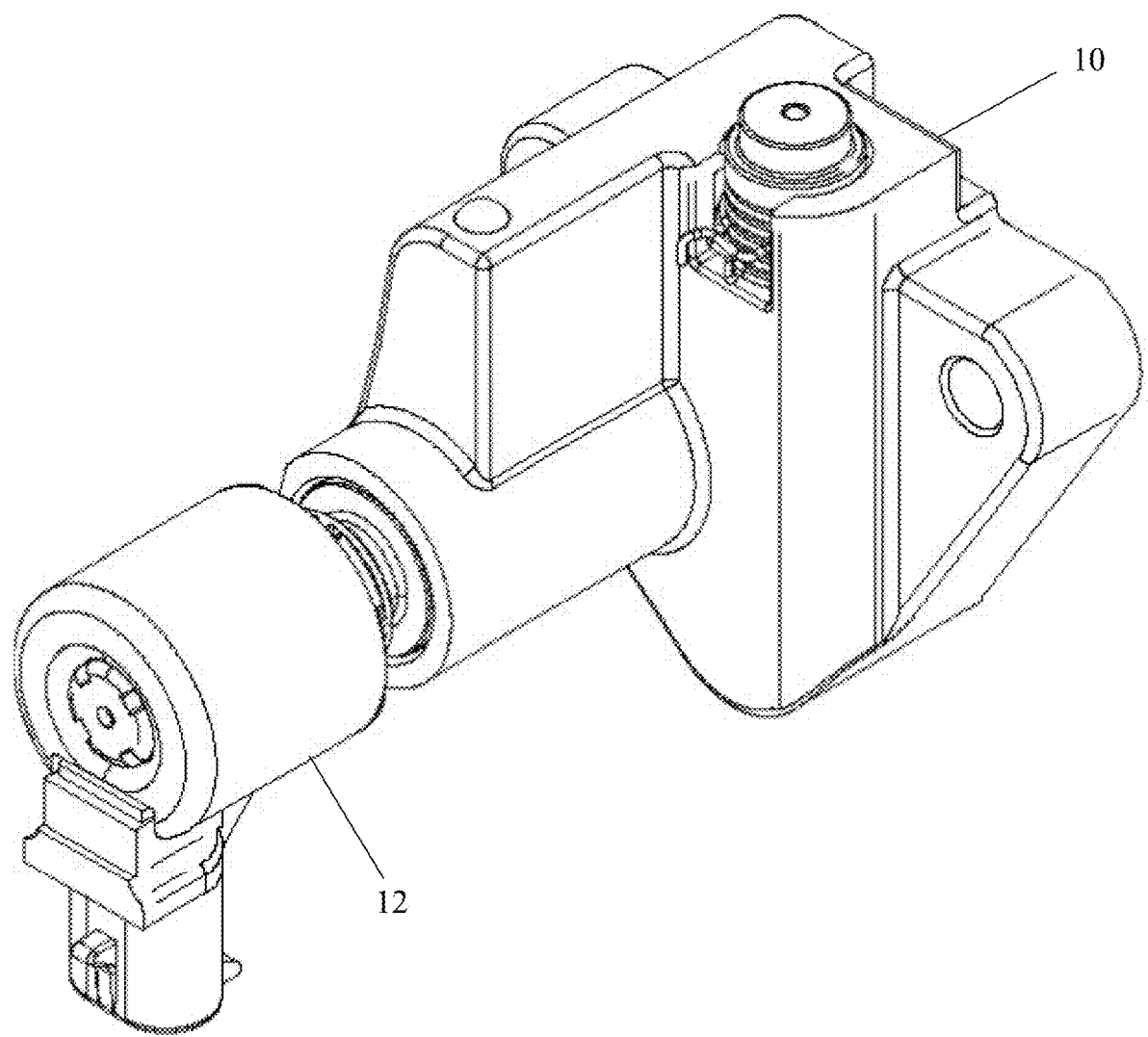
FIG. 1 shows a perspective view of the hydraulic tensioner with a mechanism for controlling the inlet pressure.
Figure 2:
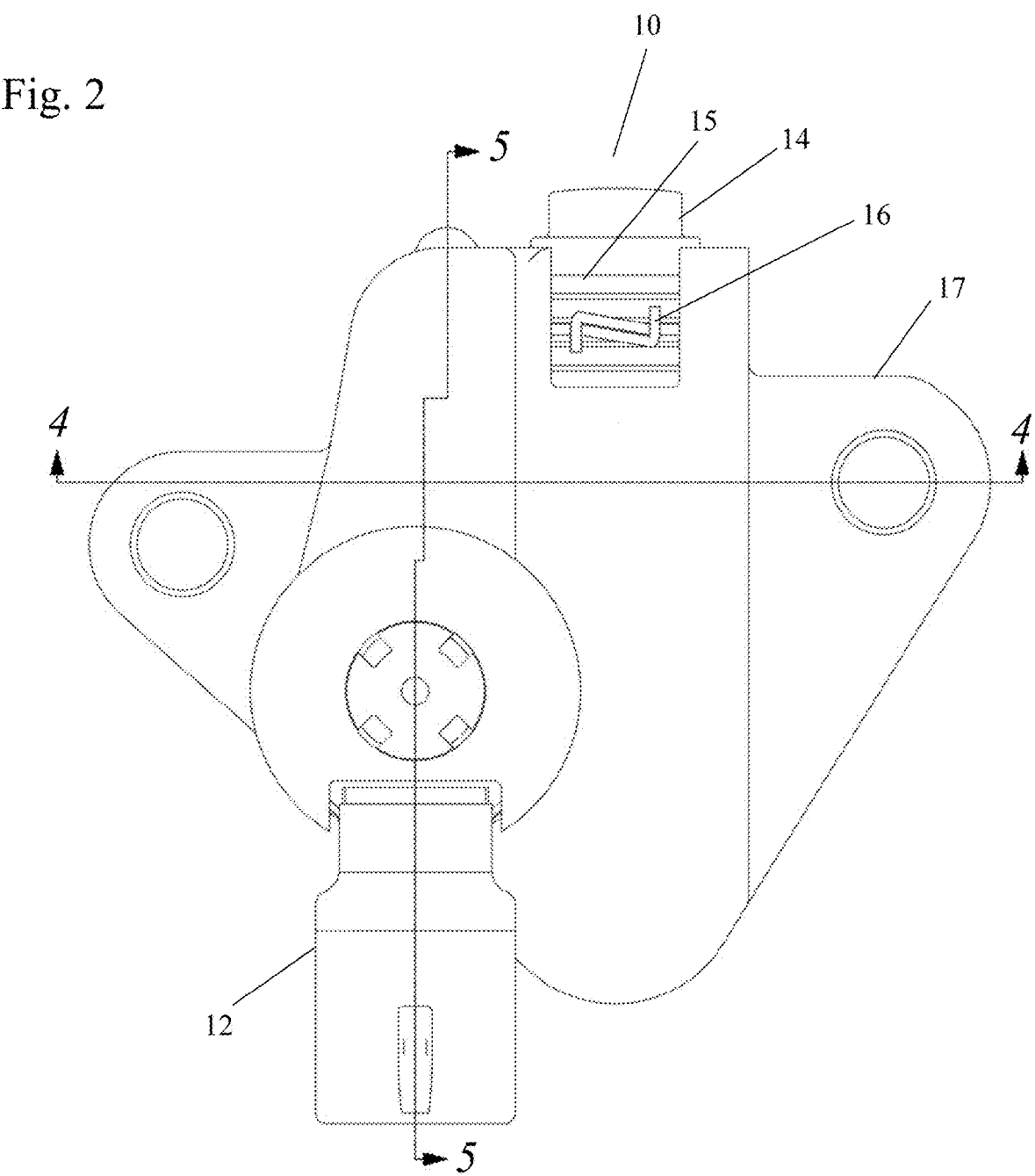
FIG. 2 shows a front view of the hydraulic tensioner with a mechanism for controlling the inlet pressure.
Figure 3:
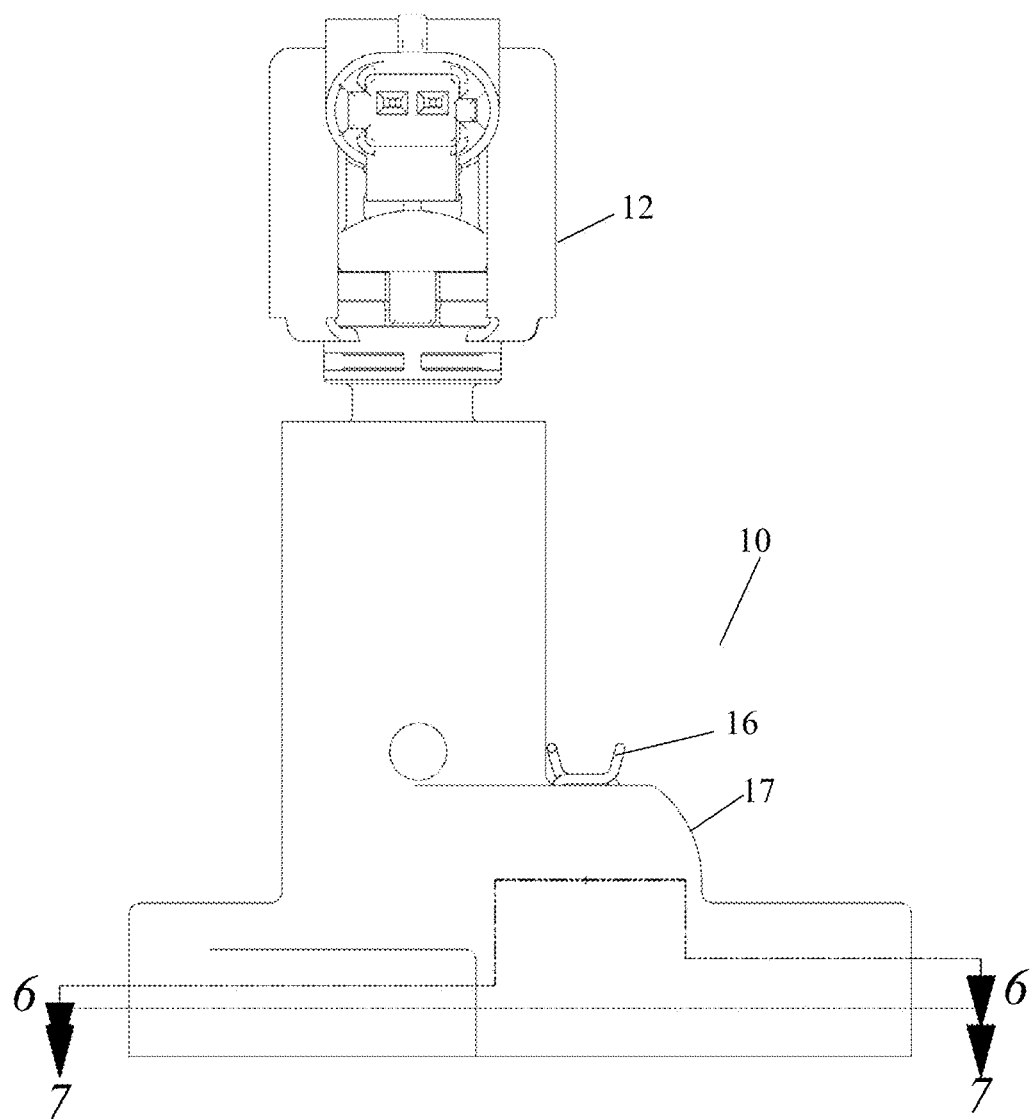
FIG. 3 shows a bottom view of the hydraulic tensioner with a mechanism for controlling the inlet pressure.
Figure 4A:
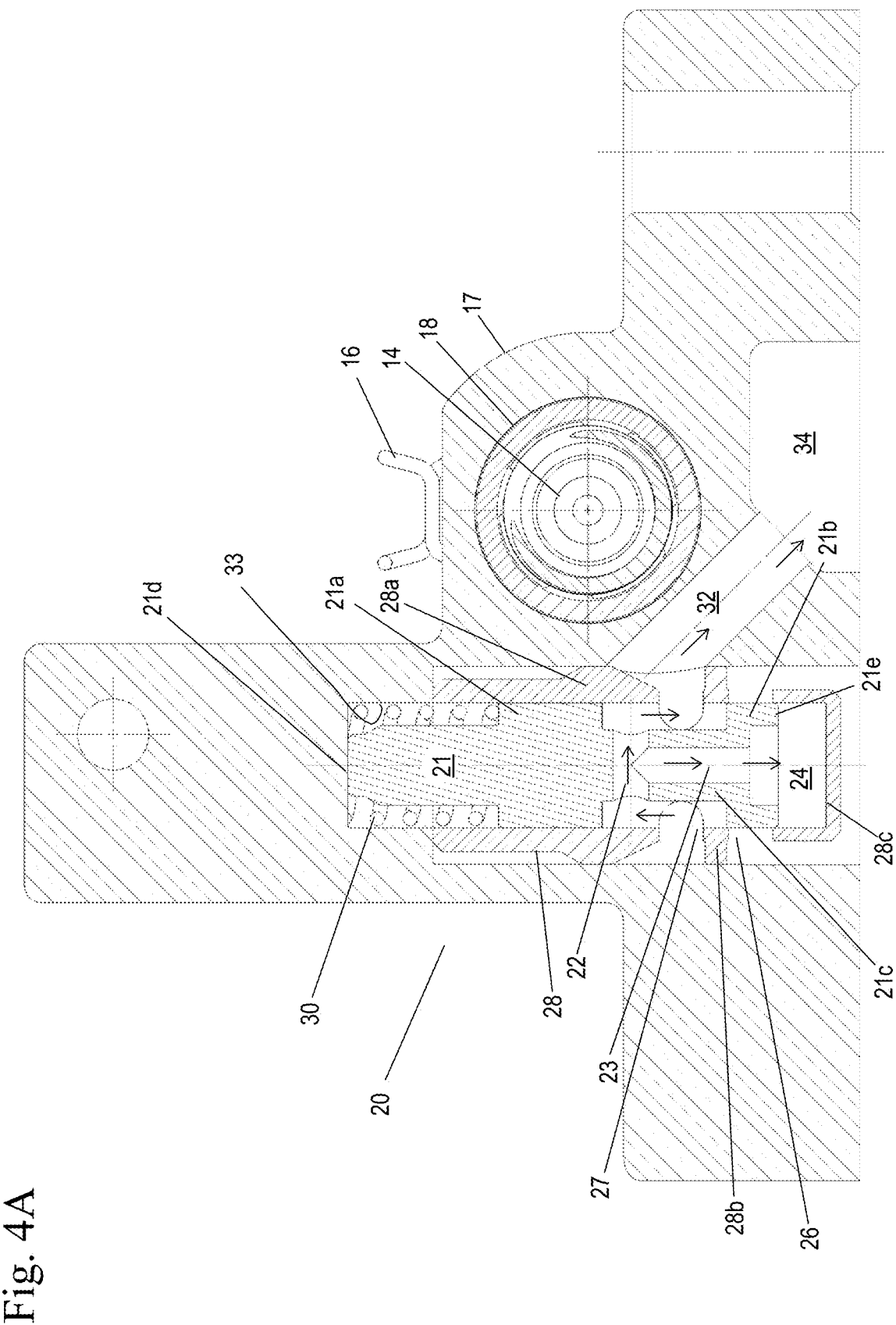
FIG. 4A shows a sectional view along line 4-4 of FIG. 2 with the pressure regulator in a first position.
Figure 5A:
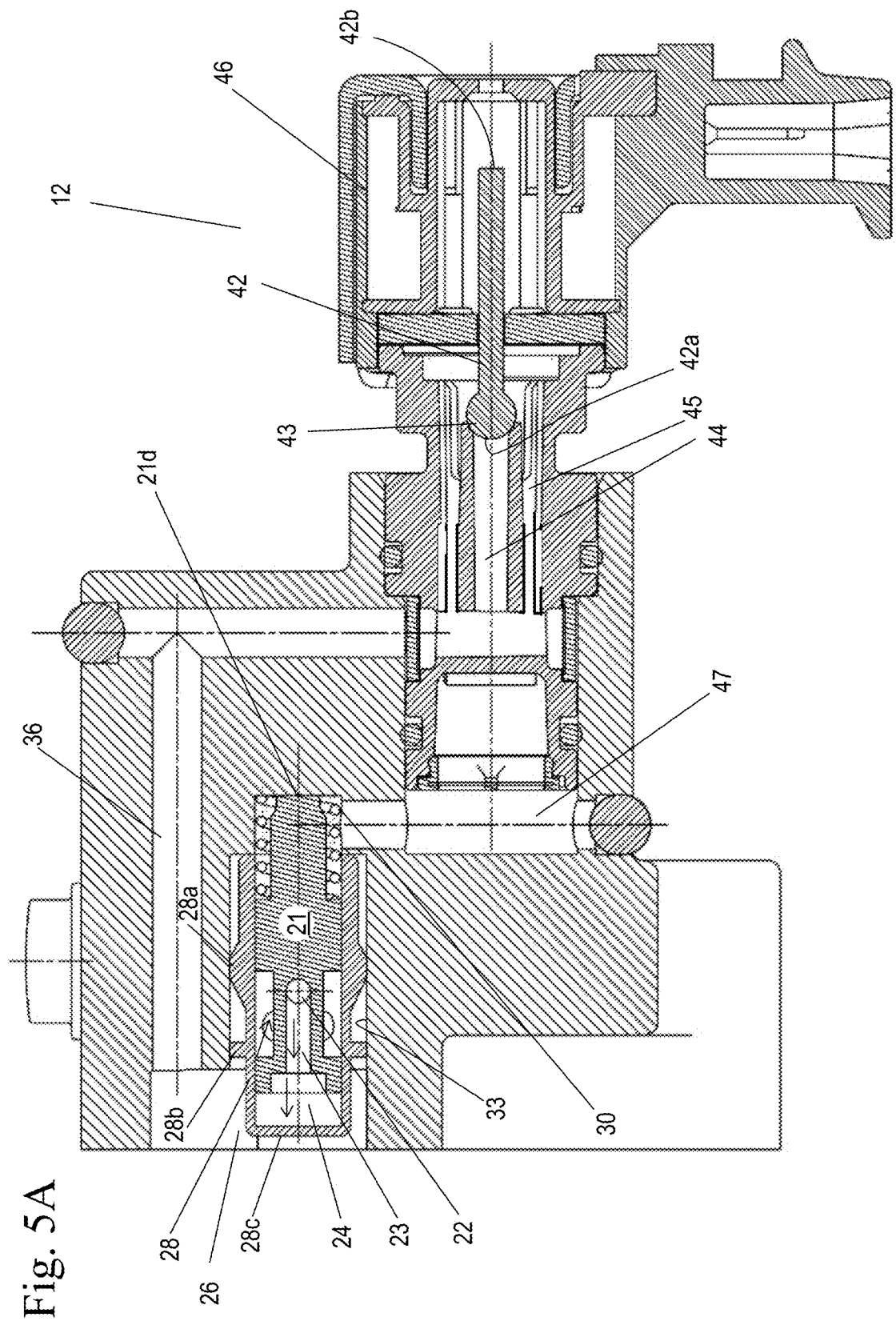
FIG. 5A shows a sectional view along line 5-5 of FIG. 2 with the pressure regulator in a first position.

FIGS. 4A and 5A show the pressure to the inlet 50 of the hydraulic tensioner 10 being regulated. Fluid enters the inlet 26 of the pressure regulator 20. Fluid flows between the first and second lands 28a and 28b of the outer sleeve 28 and the first land 21a and the second land 21b of the sleeve to passage 22 in the spindle 21c. From passage 22, fluid flows to central passage 23 to fill the chamber 24 and to reservoir 34 through passage 32. Fluid continues to flow freely into the reservoir/chamber 24, 34 until the pressure of the fluid in the reservoir 24, 34 is greater than the force of the spring 30 exerted on the first end 21d of the spool 21 of the pressure regulator 20.

At the same time, an engine controller (not shown) sends a signal to the solenoid 12, energizing the coils 46 of the solenoid 12, moving the ball armature 42 to a position in which the ball 43 of the armature blocks central passage 44, preventing fluid from recirculating through the solenoid 12 to the first end 21d of the spool 21. Instead, fluid is vented from the solenoid 12 through passages 45.

When the pressure in the reservoir 24 receives fluid at a pressure from a source that is greater than the force of the spring 30, or for example one bar, fluid will flow through the pressure regulator 20 and into reservoir 34 which feeds fluid to the high pressure chamber 52 through the inlet 50 and check valve 11 of the tensioner 10. The solenoid 12 is energized to move ball armature 43 such that fluid can vent through the solenoid 12 and prevent fluid from flowing through passages 44, 45, 47 to the first end (spring end 30) 21d of the pressure regulator 10. Fluid from the source will continue to flow into reservoirs 24 and 34 until the pressure in either of the reservoirs 24, 34 is greater than one bar. Once the pressure is greater than one bar, the spool 20 will modulate to shut off or open flow to the reservoir 34 to maintain the one bar.

Figure 4B:
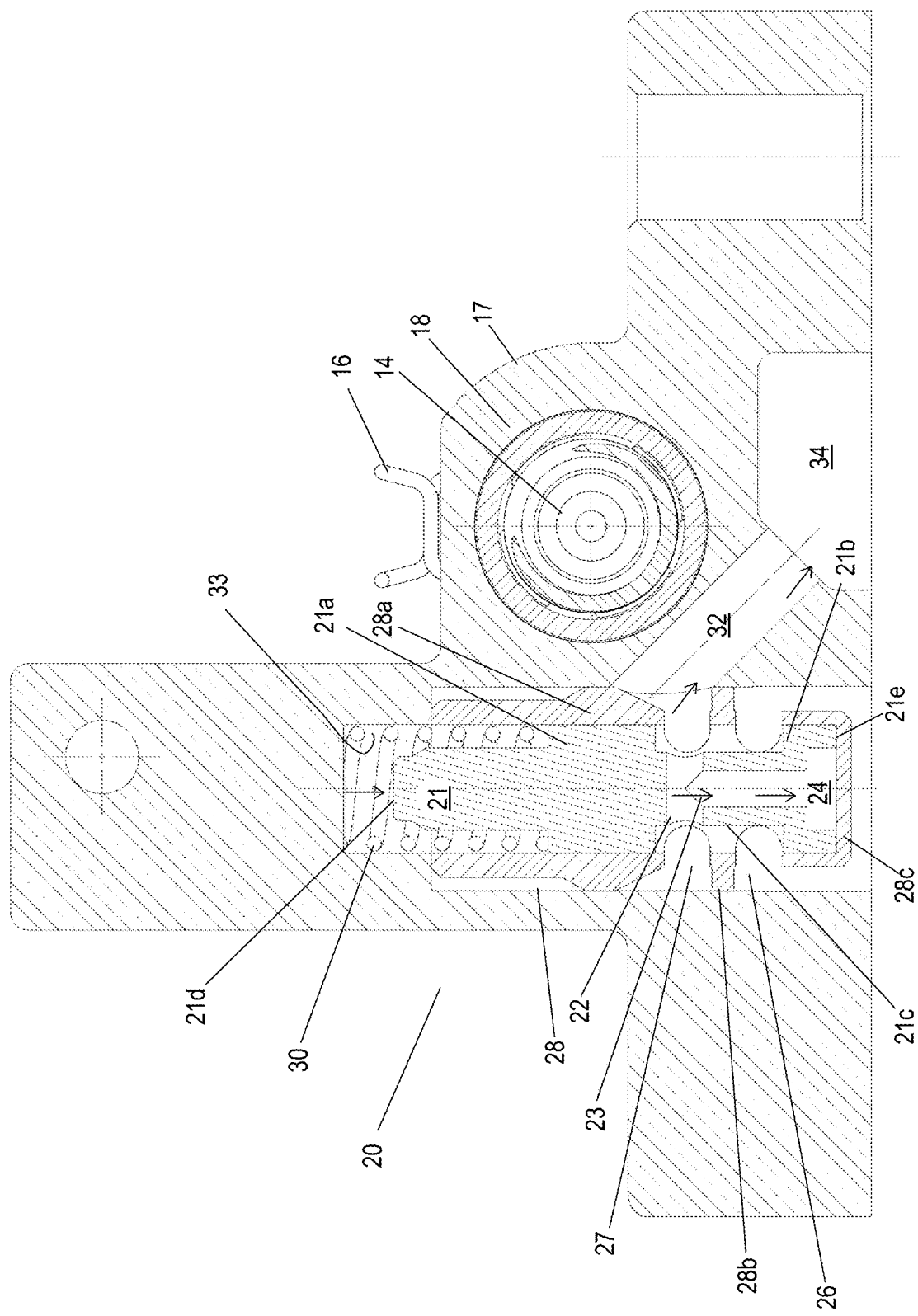
FIG. 4B shows a sectional view along line 4-4 of FIG. 2 with the pressure regulator in a second position.
Figure 5B:
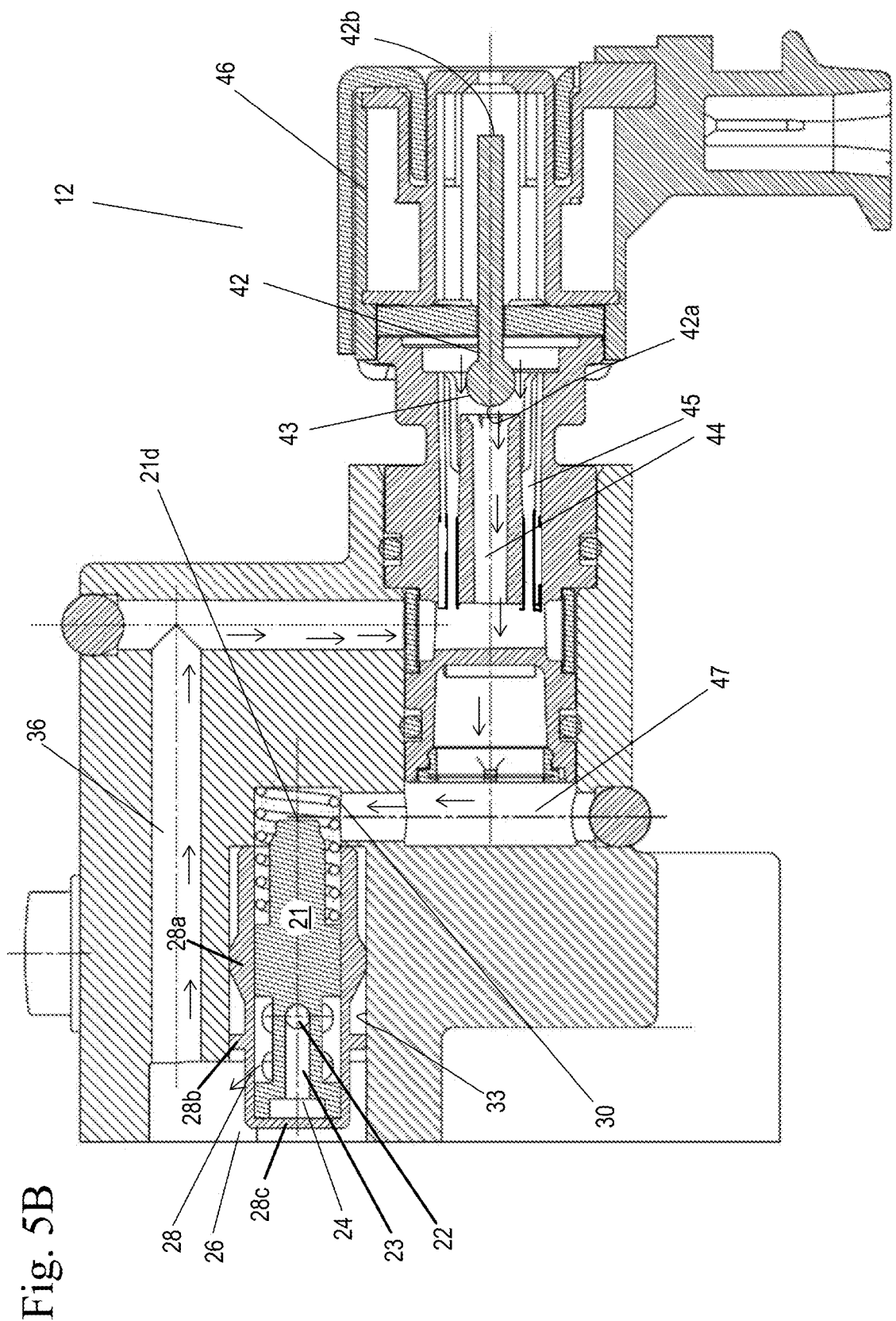
FIG. 5B shows a sectional view along line 5-5 of FIG. 2 with the pressure regulator in a second position.

Referring to FIGS. 4B and 5B, where the solenoid has been de-energized, fluid can flow from the source through the solenoid 12 and back to the pressure regulator 20 at the first end 21d of the spool. When coils 46 of the solenoid 12 are de-energized, the ball armature 42 moves to a position in which the ball 43 of the armature 42 allows fluid flow through central passage 44, allowing fluid to flow through passage 36, to passage 45, through central passage 44 and passage 47 to the first end 21d of the spool 21.

Fluid continues to flow from the source into the chamber 24 of the spool 21 and the reservoir 34 connected to the inlet 50 of the hydraulic tensioner 10.

If there is a time during the engine cycle in which the pressure is regulated, but there is a need to feed the tensioner 10 fluid within a pressure greater than the one bar of pressure, for example at high speeds, an engine controller sends a signal to the solenoid 12 to de-energize and allow fluid to be fed to the spring side 21d of the pressure regulator 20 through the solenoid 12, forcing the solenoid 12 of the pressure regulator 20 to move such that fluid may flow into the reservoirs 24, 34.

Figure 8:
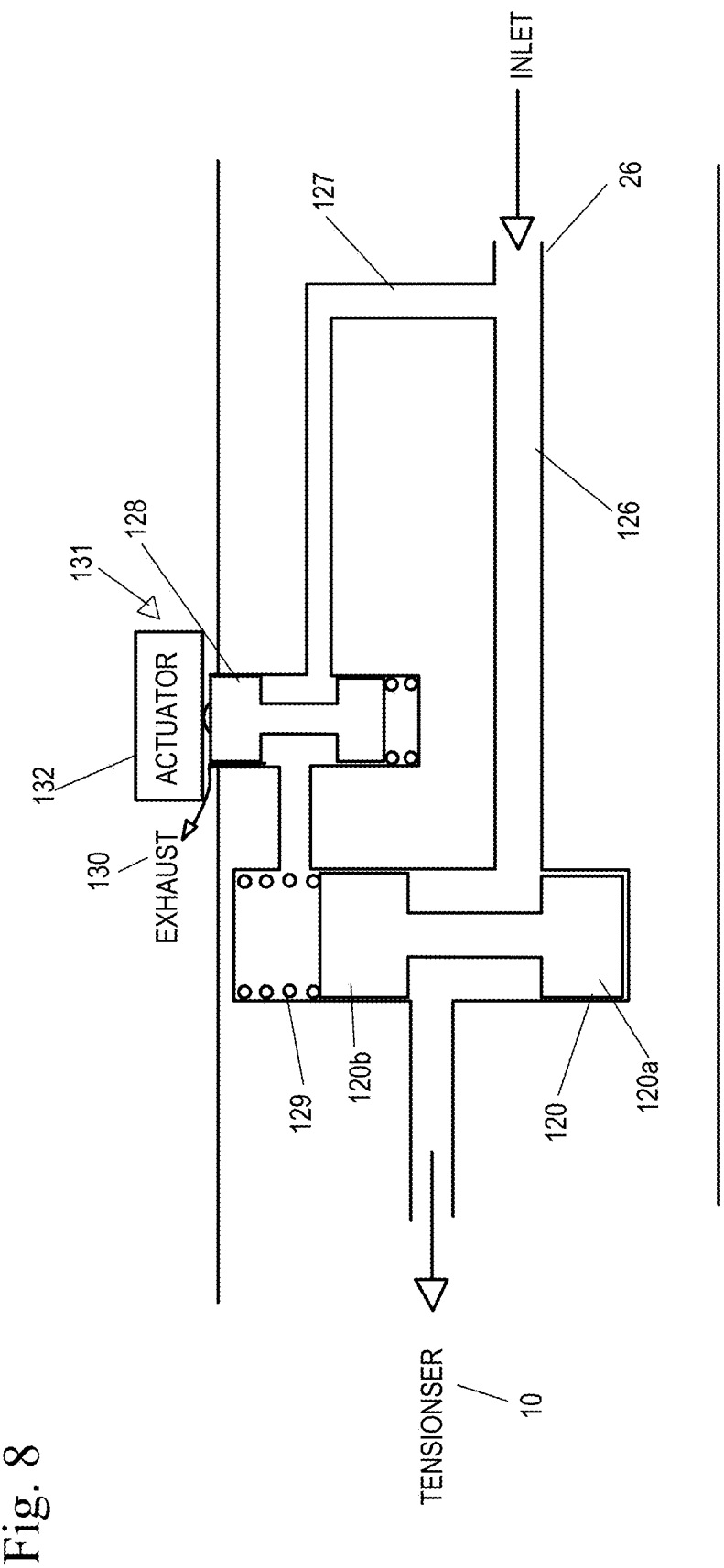
FIG. 8 shows a schematic of a second embodiment of a pressure regulator in fluid communication with an actuator and a supply inlet.

FIG. 8 shows a schematic of a pressure regulator of an alternate embodiment. The inlet line 26 is split with a first line 126 going to the pressure regulator 120 between lands 120a, 120b and a second line 127 which leads to a controller 131. The controller 131 controls whether fluid flows from the inlet, to line 127, and to the tensioner 10 through the pressure regulator 120. The controller 131 includes an actuator 132 which is controlled by an engine controller (not shown) and a means to block or allow fluid flow. The means may be a spool 128 or any other structure that can be moved to at least two positions and block or allow the flow of fluid from the inlet and line 127 to the pressure regulator 120. The controller 131 controls the fluid both flowing to the spring 129 biased end of the pressure regulator 120 and venting 130 from the spring 129 biased end of the pressure regulator 120 through the spool 128. The actuator 132 may be a variable force solenoid, two position pin solenoid, or any control device with at least two positions.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner comprising:
    a housing having a bore in communication with an inlet passage for supply of hydraulic fluid to the bore;
    a piston located in the bore of the housing;
    a spring received within the piston for biasing the piston away from the housing;
    a high pressure chamber defined by the piston, the spring, the housing and a check valve, the high pressure chamber in fluid communication with the inlet passage for supply of hydraulic fluid to the bore;
    a pressure regulator located hydraulically upstream of the inlet passage for supply of hydraulic fluid to the bore, the pressure regulator having an inlet port for coupling to a supply of hydraulic fluid under pressure and an outlet port coupled to the inlet passage, the pressure regulator comprising an input switching the pressure regulator from an off position, in which the pressure regulator passes hydraulic fluid from the inlet port to the outlet port at unaltered pressure, to an on position, in which the hydraulic fluid is passed from the inlet port to the outlet port at a regulated pressure.

2. The hydraulic tensioner of claim 1, wherein the pressure regulator comprises:
    a sleeve with a first open end and a second closed end received within a bore of the housing of the hydraulic tensioner having a first sleeve land and a second sleeve land;
    a spool slidably received within the sleeve having a first end and a second end, the second end adjacent the closed end of the sleeve, the spool comprising:
        a first land and a second land connected through a spindle;
        the outlet port formed by the spindle between the first land and the second land of the spool;
        the inlet port formed between the second sleeve land and the second closed end of the sleeve and the first land of the spool;
        a transverse through passage in the spindle of the spool in fluid communication with the the outlet port, and a reservoir for storing hydraulic fluid to the inlet passage of the hydraulic tensioner; and
        a central passage in fluid communication with the transverse through passage and a chamber formed between the second end of the spool and the second closed end of the sleeve;
    a spring between the bore of the housing and the first end of the spool for biasing the spool in a first direction;
    wherein when the spool is in a first position, hydraulic fluid is blocked from entering the chamber via the outlet port and the reservoir from the inlet port by the second land of the sleeve and the second land of the spool;
    wherein when the spool is in a second position, hydraulic fluid from the inlet port enters both the chamber and the reservoir through the transverse through passage and the central passage, supplying hydraulic fluid to the inlet passage of the hydraulic tensioner at a pressure equal to an engine oil pressure.

3. The hydraulic tensioner of claim 2, wherein the force of the spring biasing the spool is greater than a pressure exerted by the hydraulic fluid in the chamber on the second end of the spool and in the reservoir when the spool is in the first position.

4. The hydraulic tensioner of claim 2, wherein the force of the spring biasing the spool is less than a pressure exerted by hydraulic fluid in the chamber on the second end of the spool and in the reservoir when the spool is in the second position.

5. The hydraulic tensioner of claim 2, wherein the first end of the spool is in fluid communication with the inlet port through a solenoid valve.

6. The hydraulic tensioner of claim 2, further comprising:
    a solenoid in fluid communication with the inlet port and the first end of the spool,
    wherein, when the solenoid is de-energized, hydraulic fluid flows from the inlet port through the solenoid and to the first end of the spool and hydraulic fluid is blocked from entering the chamber and the reservoir from the inlet port by the sleeve;
    wherein, when the solenoid is energized, hydraulic fluid from the inlet port enters both the chamber and the reservoir through the transverse through passage and the central passage, supplying hydraulic fluid to the inlet passage of the hydraulic tensioner at a pressure equal to the engine oil pressure via the outlet port and additional hydraulic fluid from the inlet port is vented through the spool.

7. The hydraulic tensioner of claim 6, wherein the piston further comprises a plurality of teeth on an outer circumference.

8. The hydraulic tensioner of claim 6, wherein the force of the spring biasing the spool is greater than a pressure exerted by the hydraulic fluid in the chamber on the second end of the spool and in the reservoir when the spool is in the first position.

9. The hydraulic tensioner of claim 6, wherein the force of the spring biasing the spool is less than a pressure exerted by hydraulic fluid in the chamber on the second end of the spool and in the reservoir when the spool is in the second position.

10. The hydraulic tensioner of claim 1, wherein the input switching the pressure regulator from the off position to the on position is a solenoid controlled by engine controller.

11. An active pressure regulator for regulating engine oil supply to an inlet of a hydraulic tensioner comprising:
    a sleeve with a first open end and a second closed end received within a bore of a housing of the hydraulic tensioner having a first sleeve land and a second sleeve land;
    a spool slidably received within the sleeve having a first end and a second end, the second end adjacent the second closed end of the sleeve, the spool comprising:

a first spool land and a second spool land connected through a spindle;

an outlet port formed between the first spool land and the second spool land;

an inlet port formed between the the second sleeve land and the second closed end of the sleeve and the first spool land;

a transverse through passage in fluid communication with the outlet port, and a reservoir for storing fluid to the inlet of the hydraulic tensioner; and a central passage in fluid communication with the transverse through passage and a chamber formed between the second end of the spool and the second closed end of the sleeve;

a spring between the bore of the housing and the first end of the spool for biasing the spool in a first direction;

wherein when the spool is in a first position, fluid is blocked from entering the chamber via the outlet port and the reservoir from the inlet port by the second sleeve land and the second spool land;

wherein when the spool is in a second position, fluid from the inlet port enters both the chamber through the transverse through passage and the central passage, and the reservoir, supplying fluid to the inlet of the hydraulic tensioner at a pressure equal to an engine oil pressure.

12. The active pressure regulator of claim 11, wherein the force of the spring is greater than a pressure exerted by the fluid in the chamber on the second end of the spool and in the reservoir when the spool is in the first position.

13. The active pressure regulator of claim 11, wherein the force of the spring is less than a pressure exerted by fluid in the chamber on the second end of the spool and in the reservoir when the spool is in the second position.

14. The active pressure regulator of claim 11, wherein the first end of the spool is in fluid communication with the inlet port through a solenoid valve.

15. An active pressure regulator system for actively controlling pressure of fluid supplied to an inlet of a hydraulic tensioner tensioning a chain or a belt comprising:

an active pressure regulator comprising:

a sleeve with a first open end and a second closed end received within a bore of a housing of the hydraulic tensioner;

a spool slidably received within the sleeve having a first end and a second end, the second end adjacent the second closed end of the sleeve, the spool comprising:

a first spool land and a second spool land connected by a spindle;

an outlet port formed between the first spool land and the second spool land;

an inlet port formed between the second sleeve land and the second closed end of the sleeve and the first spool land;

a transverse through passage in fluid communication with the outlet port, and a reservoir for storing fluid to the inlet of the hydraulic tensioner; and a central passage in fluid communication with the transverse through passage and a chamber formed between the second end of the spool and the second closed end of the sleeve;

a spring between the bore of the housing and the first end of the spool for biasing the spool in a first direction; and a solenoid in fluid communication with the inlet port and the first end of the spool, wherein, when the solenoid is de-energized, fluid flows from the inlet port through the solenoid and to the first end of the spool and fluid is blocked from entering the chamber and the reservoir from the inlet port by the sleeve;

wherein, when the solenoid is energized, fluid from the inlet port enters the chamber and the reservoir through the transverse through passage and the central passage, supplying fluid to the inlet of the hydraulic tensioner at a pressure equal to an engine oil pressure and additional fluid from the inlet port is vented through the spool.

16. The active pressure regulator system of claim 15, wherein the hydraulic tensioner further comprises:

a hydraulic tensioner bore formed in the housing;

a hydraulic tensioner piston received within the hydraulic tensioner bore having an outer circumference with a plurality of teeth;

a spring received within the hydraulic tensioner piston for biasing the hydraulic tensioner piston away from the housing; and a high pressure chamber defined by the hydraulic tensioner piston, the spring biasing the hydraulic tensioner piston and the housing and in fluid communication with the inlet passage of the hydraulic tensioner.

\* \* \* \* \*